(12) United States Patent
Chen et al.

(10) Patent No.: US 9,570,973 B2
(45) Date of Patent: Feb. 14, 2017

(54) BRIDGELESS POWER FACTOR CORRECTION CIRCUIT AND CONTROL METHOD UTILIZING CONTROL MODULE TO CONTROL CURRENT FLOW IN POWER MODULE

(71) Applicant: Huawei Technologies Co., Ltd., Shenzhen (CN)

(72) Inventors: Wenbin Chen, Shenzhen (CN); Shengyong Dai, Shenzhen (CN); Boning Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 14/017,442

(22) Filed: Sep. 4, 2013

(65) Prior Publication Data
US 2014/0002033 A1    Jan. 2, 2014

Related U.S. Application Data (63) Continuation of application No. PCT/CN2012/083907, filed on Nov. 1, 2012.

(30) Foreign Application Priority Data

Feb. 9, 2012    (CN) .......................... 2012 1 0028511

(51) Int. Cl.
*H02M 1/42*    (2007.01)
*H02M 7/04*    (2006.01)
(Continued)

(52) U.S. Cl.
CPC ............ *H02M 1/4208* (2013.01); *H02M 1/14* (2013.01); *H02M 1/4225* (2013.01); *H02M 7/04* (2013.01);
(Continued)

(58) Field of Classification Search
CPC ............ H02M 7/04; H02M 1/41; H02M 1/14
See application file for complete search history.

(56) References Cited

U.S. PATENT DOCUMENTS 6,252,782 B1 * 6/2001 Akashi ................ H02M 3/3378
363/132
6,603,353 B2 * 8/2003 Ishida ................... H03F 3/2173
330/207 A
(Continued)

FOREIGN PATENT DOCUMENTS

CN        1600048 A     3/2005
CN        1864319 A    11/2006
(Continued)

OTHER PUBLICATIONS

English Translation of CN102104324.*
(Continued)

*Primary Examiner* — Timothy J Dole
*Assistant Examiner* — Ishrat Jamali
(74) *Attorney, Agent, or Firm* — Conley Rose, P.C.

(57) ABSTRACT

A bridgeless power factor correction (PFC) circuit, which includes an alternating current power supply module, a power module, and a control module; the power module includes one or more interleaved PFC circuits, each interleaved PFC circuit includes one inductor, one pair of first switching components, and at least one capacitor, a first end of the inductor is connected to the alternating current power supply module, and a second end of the inductor is connected to one end of each capacitor through one of the first switching components and is also connected to the other end of each capacitor through the other one of the first switching components; and the control module samples a current of
(Continued)

each first switching component in the power module, and turns off a first switching component through which a negative current flows.

20 Claims, 7 Drawing Sheets

(51) Int. Cl.
*H02M 1/14* (2006.01)
*H02M 3/158* (2006.01)

(52) U.S. Cl.
CPC ..... *H02M 2003/1586* (2013.01); *Y02B 70/126* (2013.01)

(56) References Cited

U.S. PATENT DOCUMENTS

| | | | |
|---|---|---|---|
| 6,735,097 | B1 | 5/2004 | Prasad et al. |
| 8,476,873 | B2* | 7/2013 | Green ............................ 323/207 |
| 2003/0102818 | A1 | 6/2003 | Shen |
| 2007/0058402 | A1* | 3/2007 | Shekhawat et al. ............ 363/89 |
| 2011/0012579 | A1 | 1/2011 | Huang |
| 2011/0090725 | A1* | 4/2011 | Lu ....................... H02M 3/1588 363/127 |
| 2011/0149622 | A1 | 6/2011 | Lin |
| 2012/0139505 | A1 | 6/2012 | Ren et al. |

FOREIGN PATENT DOCUMENTS

| | | |
|---|---|---|
| CN | 101707441 A | 5/2010 |
| CN | 101958657 A | 1/2011 |
| CN | 102035364 A | 4/2011 |
| CN | 102104324 A | 6/2011 |
| CN | 102545582 A | 7/2012 |
| EP | 2405562 A1 | 1/2012 |
| EP | 2658106 A1 | 10/2013 |

OTHER PUBLICATIONS

English Translation of CN1864319.*
Foreign Communication From a Counterpart Application, Chinese Application No. 201210028511.5, Chinese Office Action dated Aug. 21, 2013, 8 pages.
Foreign Communication From a Counterpart Application, Chinese Application No. 201210028511.5, Chinese Search Report dated Aug. 9, 2013, 2 pages.
Foreign Communication From a Counterpart Application, PCT Application No. PCT/CN2012/083907, Chinese Search Report dated Jan. 31, 2013, 7 pages.
Foreign Communication From a Counterpart Application, PCT Application No. PCT/CN2012/083907, Chinese Written Opinion dated Jan. 31, 2013, 6 pages.
Marxgut, C., "Interleaved Triangular Current Mode (TCM) Resonant Transition, Single Phase PFC Rectifier with High Efficiency and High Power Density", The 2010 International Power Electronics Conference, Jun. 21, 2010, pp. 1725-1732.
Foreign Communication From a Counterpart Application, European Application No. 12865547.9, Extended European Search Report dated Dec. 18, 2014, 9 pages.

* cited by examiner

BRIDGELESS POWER FACTOR CORRECTION CIRCUIT AND CONTROL METHOD UTILIZING CONTROL MODULE TO CONTROL CURRENT FLOW IN POWER MODULE

CROSS-REFERENCE TO RELATED APPLICATIONS

This application is a continuation of International Application No. PCT/CN2012/083907, filed on Nov. 1, 2012, which claims priority to Chinese Patent Application No. 201210028511.5, filed on Feb. 9, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of electronic circuits, and in particular, to a bridgeless power factor correction (PFC) circuit which adopts a triangular current mode (TCM), and a control method thereof.

BACKGROUND

Figure 1:
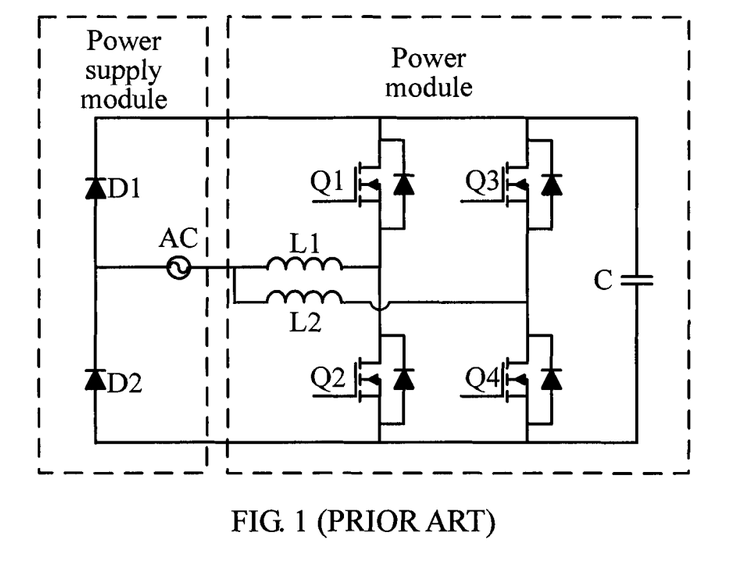
FIG. 1 is a structural diagram of an existing two-phase interleaved bridgeless PFC circuit.

A conventional bridge PFC circuit has many conduction devices therein and a large on-state loss, and is not suitable for application in scenarios of medium or large power. However, a bridgeless PFC circuit may reduce the on-state loss and improve the efficiency. As the market demand for a high efficiency and high power density power supply increases, the replacement of the conventional bridge PFC circuit with the bridgeless PFC circuit becomes a trend. FIG. 1 shows a topology of a bridgeless PFC circuit, which is a two-phase interleaved bridgeless PFC circuit.

An existing bridgeless PFC circuit generally adopts a critical mode (CRM) control method. That is, when an inductive current approaches zero, a switching component (for example, a metal-oxide-semiconductor field-effect transistor (MOSFET)) is turned off, the current continues to flow through a body diode of the switching component, and zero voltage switching (ZVS) is implemented depending on a reverse recovery current of the body diode of the switching component.

In the two-phase interleaved bridgeless PFC circuit shown in FIG. 1, two bridge arms work with a 180-degree phase difference between drives of the bridge arms. In the same way, if the bridgeless PFC circuit has three bridge arms, three bridge arms work with a 120-degree phase difference among drives of the bridge arms. A working principle of a single bridge arm (that is, a bridge arm connected to an inductor L1) is briefly introduced herein. In the positive half cycle of inputting an alternating current, a MOSFET Q2 acts as a main transistor. In the on time $T_{on}$ of the MOSFET Q2, a current loop passes through the inductor L1, the MOSFET Q2, and the diode D2, and at this time, the inductor L1 stores energy. In the off time $T_{off}$ of the MOSFET Q2, the current loop passes through the inductor L1, a MOSFET Q1, a capacitor C, and the diode D2, and at this time, the inductor L1 outputs energy. Similarly, in the negative half cycle of inputting an alternating current, the MOSFET Q1 acts as the main transistor. In the on time $T_{on}$ of the MOSFET Q1, the current loop passes through a diode D1, the MOSFET Q1, and the inductor L1, and at this time, the inductor L1 stores energy. In the off time $T_{off}$ of the MOSFET Q1, the current loop passes through the diode D1, the capacitor C, the MOSFET Q2, and the inductor L1, and at this time, the inductor L1 outputs energy.

The bridge arm connected to the inductor L1 is still taken as an example to illustrate the principle of a CRM control manner in the following. For the sake of simplicity, only a working principle in the positive half cycle of inputting the alternating current is introduced herein.

Figure 2:
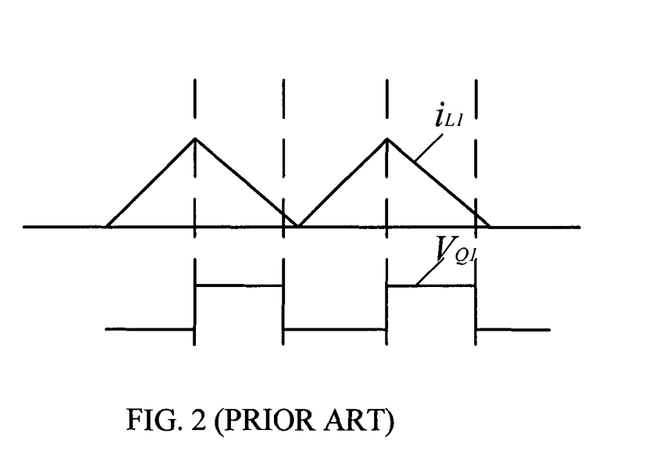
FIG. 2 is a current waveform of an inductor L1 and a drive waveform of a MOSFET Q1 in an existing bridgeless PFC circuit.

In the positive half cycle of inputting the alternating current, the MOSFET Q2 acts as the main transistor. In the on time $T_{on}$ of the MOSFET Q2, the current loop passes through the inductor L1, the MOSFET Q2, and the diode D2, and in the off time $T_{off}$ of the MOSFET Q2, the current loop passes through the inductor L1, the MOSFET Q1, the capacitor C, and the diode D2. At this time, the MOSFET Q1 acts as a synchronous rectifier transistor, and in this period of time, the MOSFET Q1 is driven, so that the MOSFET Q1 is turned on, and a current flowing through the inductor L1 drops linearly. When it is detected that the current of the inductor L1 drops near zero ampere (A), the MOSFET Q1 is turned off, so that the current continues to flow through the body diode of the MOSFET Q1. Because of a reverse recovery characteristic of the body diode of the MOSFET Q1, a certain reverse recovery current exists, and this reverse recovery current is used to conduct the body diode of the MOSFET Q2, thereby implementing zero voltage switching of the MOSFET Q2. FIG. 2 shows the current waveform (a triangular wave) of the inductor L1 and the drive voltage waveform (a square wave) of the MOSFET Q1. The principle in the negative half cycle of inputting the alternating current is similar to that in the positive half cycle of inputting the alternating current.

However, the reverse recovery current flowing through the body diode of the switching component (for example, a MOSFET) is uncontrollable, and the reverse recovery current changes with the input voltage and the load. Meanwhile, the reverse recovery current also influences a soft switching state of the switching component. In addition, in the case of inputting a high voltage, the inductor cannot obtain a negative current, and therefore, zero voltage switching of the switching component (that is, a MOSFET) cannot be implemented.

SUMMARY

Embodiments of the present invention provide a bridgeless PFC circuit, which can solve the problem that an existing bridgeless PFC circuit introduces an uncontrollable reverse recovery current and further influences a soft switching state of a switching component.

In one aspect, a bridgeless PFC circuit is provided, which includes an alternating current power supply module, a power module, and a control module. The alternating current power supply module is connected to the power module, so as to provide electrical energy for the power module. The power module includes one or more interleaved PFC circuits, where each interleaved PFC circuit includes one inductor, one pair of first switching components, and at least one capacitor, where a first end of the inductor is connected to the alternating current power supply module, and a second end of the inductor is connected to one end of each capacitor through one of the first switching components and is also connected to the other end of each capacitor through the other one of the first switching components. The control module samples a current flowing through each first switching component in the power module, and turns off a first switching component through which a negative current flows.

In another aspect, a control method of a bridgeless PFC circuit is provided, where the bridgeless PFC circuit includes an alternating current power supply module, a power module, and a control module. The alternating current power supply module is connected to the power module, so as to provide electrical energy for the power module. The power module includes one or more interleaved PFC circuits, where each interleaved PFC circuit includes one inductor, one pair of first switching components, and at least one capacitor, where a first end of the inductor is connected to the alternating current power supply module, and a second end of the inductor is connected to one end of each capacitor through one of the first switching components and is also connected to the other end of each capacitor through the other one of the first switching components. The control module is configured to turn off a first switching component in the power module. The method includes: detecting, by the control module, a current flowing through each first switching component in the power module; and when it is detected that the current reaches a preset current, turning off, by the control module, a first switching component through which the preset current flows.

In the bridgeless PFC circuit of the embodiments of the present invention, because a TCM control method different from a CRM is adopted, the uncontrollable reverse recovery current is eliminated in the bridgeless PFC circuit, thereby reducing the loss caused by the reverse recovery current of a body diode of the switching component. The reverse recovery current of the body diode of the switching component is used to conduct a body diode of another switching component, thereby implementing zero voltage switching of the switching component.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

A bridgeless PFC circuit according to an embodiment of the present invention is described with reference to FIG. 3 in the following.

Figure 3:
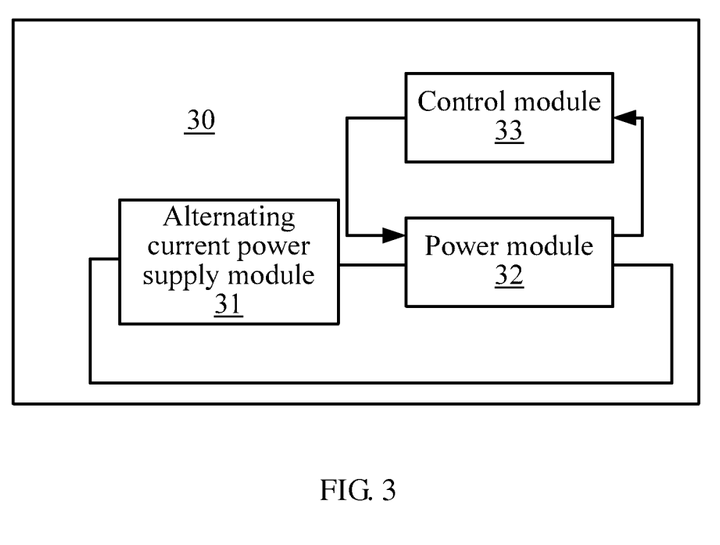
FIG. 3 is a schematic structural diagram of a bridgeless PFC circuit according to an embodiment of the present invention.

As shown in FIG. 3, a bridgeless PFC circuit 30 includes an alternating current power supply module 31, a power module 32, and a control module 33, where the alternating current power supply module 31 is connected to the power module 32 and provides electrical energy for the power module 32; in addition, the power module 32 includes at least one pair of first switching components Q1 and Q2, and the control module 33 samples currents of the first switching components Q1 and the Q2 in the power module 32, and turns off a first switching component through which a negative current flows. As can be seen, a TCM control method is introduced in the bridgeless PFC circuit 30 through the control module 33. That is, only when a negative current flows through a switching component, the switching component is turned off, thereby avoiding a reverse recovery current in a body diode of the switching component.

The alternating current power supply module 31 includes an alternating current power supply and two second switching components, where each of the second switching components is connected to the alternating current power supply and one of the first switching components Q1 and Q2 in the power module.

Generally, the first switching components Q1 and Q2 may be insulated gate devices, for example, insulated gate bipolar transistors (IGBTs) or MOSFETs, and the second switching component may be a diode, a MOSFET, an IGBT or the like.

In addition, the power module 32 includes one or more interleaved PFC circuits. Taking one interleaved PFC circuit as an example, as shown in FIG. 3, one interleaved PFC circuit includes one inductor L1, one pair of first switching components Q1 and Q2, and at least one capacitor C. A first end of the inductor L1 is connected to the alternating current power supply module 31, and a second end of the inductor L1 is connected to one end of each capacitor C through the first switching component Q1 and is also connected to the other end of each capacitor C through the first switching component Q2. It should be understood that because the capacitor C is an energy storage component, when one interleaved PFC circuit includes a plurality of capacitors C, these capacitors C may be connected in parallel. That is to say, after the plurality of capacitors C are connected in parallel, one end of a parallel connection of the plurality of capacitors C is connected to the first switching component Q1, and the other end of the parallel connection is connected to the first switching component Q2.

In addition, the control module 33 includes a current sampling component and a TCM controller. One end of the current sampling component is connected to a drain or a source of each first switching component Q1 (or Q2) in the power module 32, and the other end of the current sampling component is connected to an input end of the TCM controller. An output end of the TCM controller is connected to a gate of each first switching component Q1 (or Q2) in the power module 32. Because the TCM controller sets a threshold for the negative current, when a sample current obtained by the current sampling component reaches the threshold, the TCM controller turns off the first switching component Q1 (or Q2) through which the sample current reaches the threshold.

For example, the current sampling component includes a resistor or a current transformer (CT). The TCM controller is formed by a discrete component or a logic device, for example, a complex programmable logic device (CPLD) or a field programmable gate array (FPGA).

A bridgeless PFC circuit according to the embodiment of the present invention adopts a TCM controller to introduce a TCM control method, so that an uncontrollable reverse recovery current is eliminated in the bridgeless PFC circuit, thereby reducing the loss caused by a reverse recovery current of a body diode of a switching component. The reverse recovery current of the body diode of the switching component is used to conduct a body diode of another switching component, thereby implementing zero voltage switching of the switching component.

The implementation principle of the TCM control method is specifically illustrated in the following.

Figure 4:
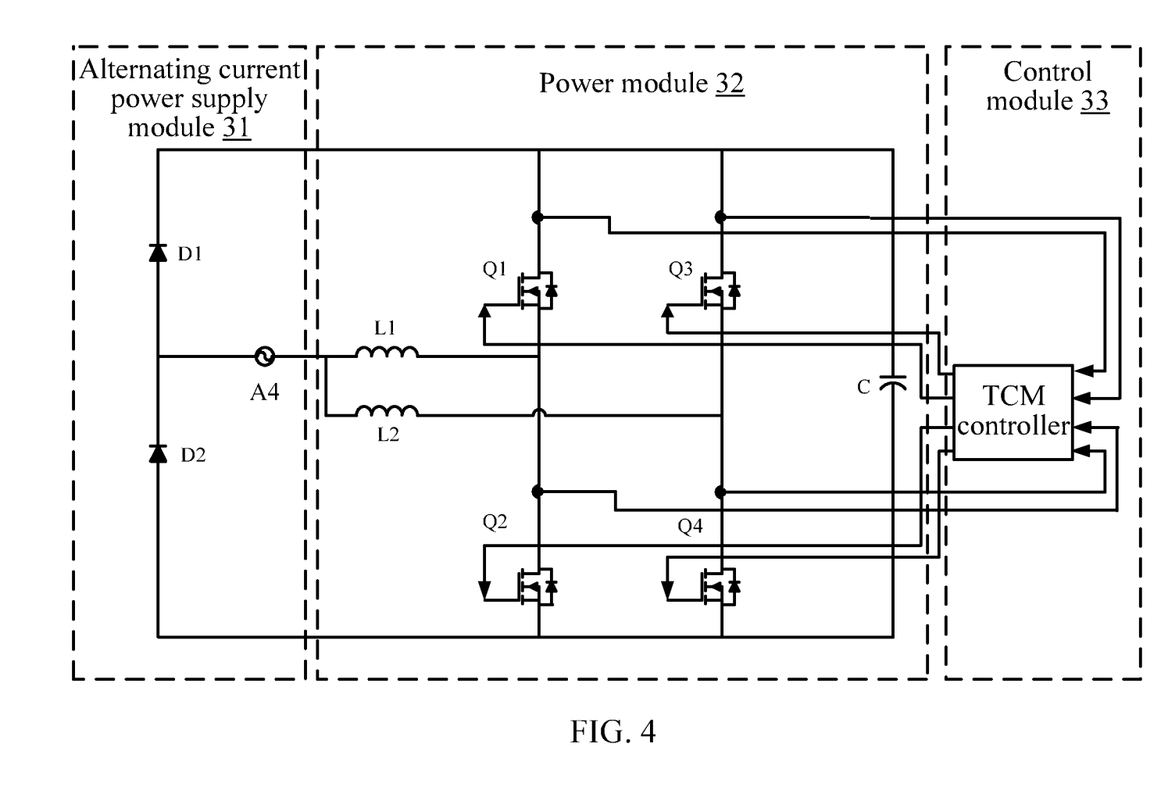
FIG. 4 is a structural diagram of a two-phase interleaved bridgeless PFC circuit according to an embodiment of the present invention.

As shown in FIG. 4, a two-phase interleaved bridgeless PFC circuit with the first switching components being MOSFETs is taken as an example to illustrate the TCM control method of the bridgeless PFC circuit in the embodiment of the present invention. First, currents flowing through four MOSFETs (that is, Q1, Q2, Q3, and Q4) are detected, and a detection result is used as current sample information and sent to a TCM controller. Next, the TCM controller controls on/off of the four MOSFETs (that is, Q1, Q2, Q3, and Q4) according to directions and values of currents in the current sample information, so as to finally implement soft switching of the four MOSFETs (that is, Q1, Q2, Q3, and Q4).

Figure 5:
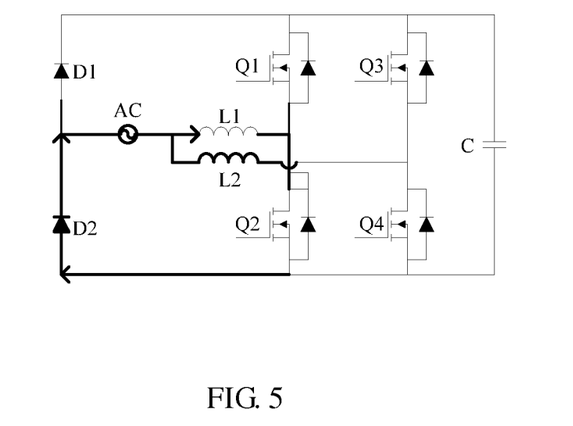
FIG. 5 is a first current direction diagram of a bridgeless PFC circuit according to an embodiment of the present invention.
Figure 6:
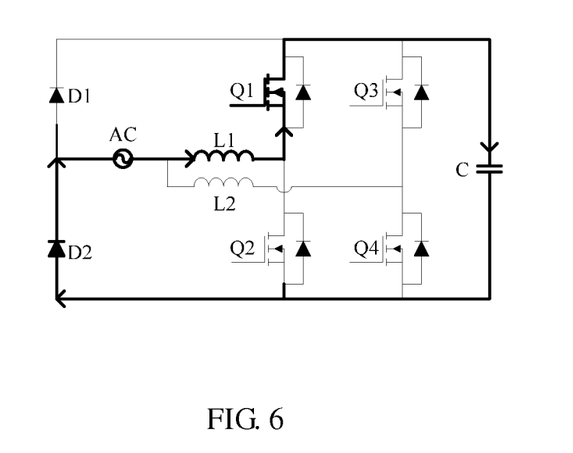
FIG. 6 is a second current direction diagram of a bridgeless PFC circuit according to an embodiment of the present invention.

With reference to FIG. 5 and FIG. 6, the positive half cycle of inputting an alternating current and a bridge arm connected to the inductor L1 are still taken as an example to introduce the principle of the TCM control method in the following. In the positive half cycle of inputting the alternating current, the MOSFET Q2 acts as a main transistor. In the on time $T_{on}$ of the MOSFET Q2, a current loop passes through the inductor L1, the MOSFET Q2, and a diode D2, as shown in FIG. 5. In the off time $T_{off}$ of the MOSFET Q2, the current loop passes through the inductor L1, the MOSFET Q1, the capacitor C, and the diode D2, as shown in FIG. 6. At this time, the MOSFET Q1 acts as a synchronous rectifier transistor, the MOSFET Q1 keeps conducted during the off time $T_{off}$, so that a current of the inductor L1 drops linearly.

When the current of the inductor L1 drops to a negative current, three cases exist.

Figure 7:
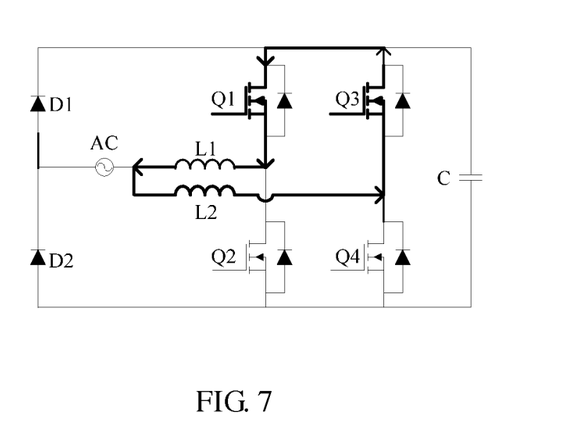
FIG. 7 is a third current direction diagram of a bridgeless PFC circuit according to an embodiment of the present invention.

A first case: if another MOSFET Q3 is also on at this time, the current forms a loop through the inductor L1, an inductor L2, the MOSFET Q3, and the MOSFET Q1 as shown in FIG. 7, so that a negative current is generated on the inductor L1.

Figure 8:
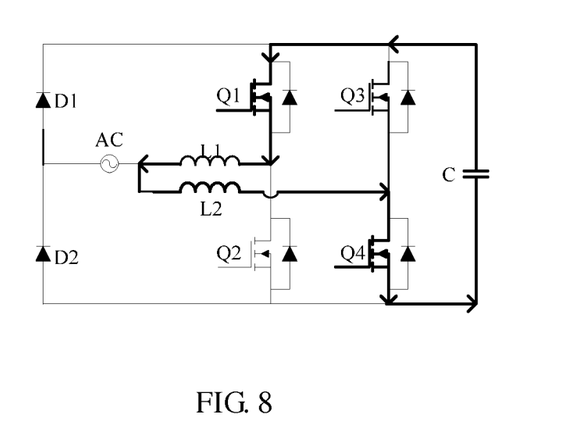
FIG. 8 is a fourth current direction diagram of a bridgeless PFC circuit according to an embodiment of the present invention.

A second case: if another MOSFET Q3 is off, but the MOSFET Q4 is in an on state at this time, the current forms a loop through the MOSFET Q1, the inductor L1, the inductor L2, the MOSFET Q4, and the capacitor C as shown in FIG. 8, so that a negative current is also generated on the inductor L1.

Figure 9:
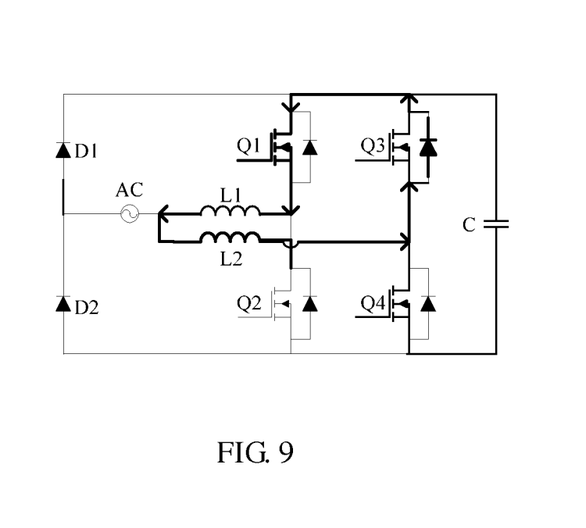
FIG. 9 is a fifth current direction diagram of a bridgeless PFC circuit according to an embodiment of the present invention.

A third case: if neither the MOSFET Q3 nor the MOSFET Q4 is on at this time, the current forms a loop through the MOSFET Q1, the inductor L1, the inductor L2, and the body diode of the MOSFET Q3 as shown in FIG. 9, so that a negative current is also generated on the inductor L1.

When the TCM controller detects that the current of the inductor drops to a certain negative current (the negative current may be set through the TCM controller), the TCM controller turns off the MOSFET Q1 at this time. In this way, the current does not flow through the body diode of the MOSFET Q1, thereby reducing the loss caused by a reverse recovery current of the body diode of the MOSFET Q1. This negative current is used to conduct the body diode of the MOSFET Q2, thereby implementing zero voltage switching of the MOSFET Q2.

Figure 10:
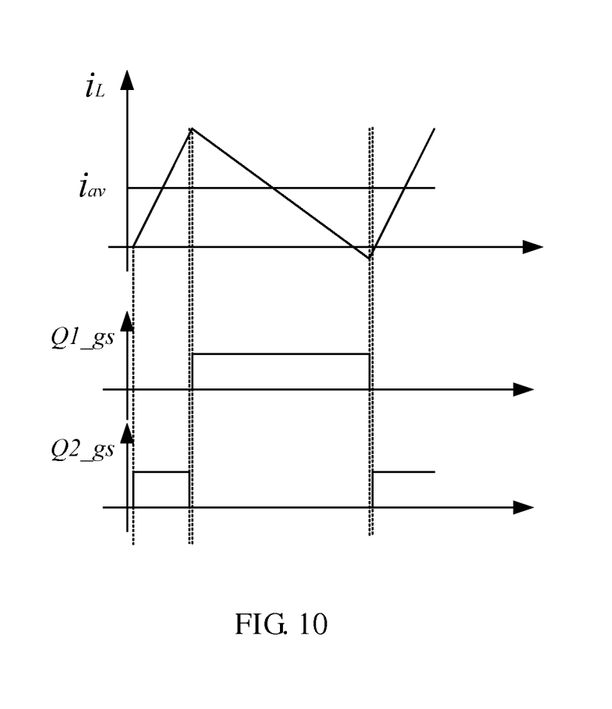
FIG. 10 shows a current waveform of an inductor L1 and drive waveforms of a MOSFET Q1 and a MOSFET Q2 in a bridgeless PFC circuit according to an embodiment of the present invention.

A triangular waveform shown in FIG. 10 is a current waveform of the inductor L1, and square waves are drive waveforms of the MOSFET Q1 and the MOSFET Q2. As can be seen in FIG. 10, in the on period of the MOSFET Q2, the current of the inductor L1 rises. However, after the MOSFET Q2 is turned off, the MOSFET Q1 keeps conducted. The TCM controller does not turn off the MOSFET Q1 until the TCM controller detects that a current flowing through the MOSFET Q1 is a negative current. In this way, the current does not flow through the body diode of the MOSFET Q1, thereby reducing the loss caused by the reverse recovery current of the body diode of a body MOSFET Q1. This negative current is used to conduct the body diode of the MOSFET Q2, so that soft switching of the MOSFET Q1 and the MOSFET Q2 is implemented.

Figure 11:
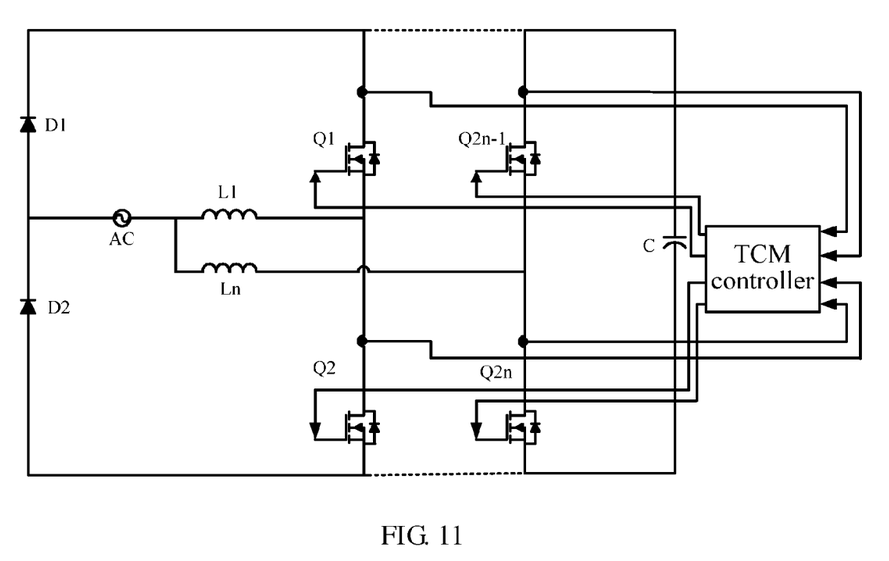
FIG. 11 is a structural diagram of an N-phase interleaved bridgeless PFC circuit according to an embodiment of the present invention.

FIG. 11 is a bridgeless PFC circuit having an N-phase interleaved PFC circuit according to an embodiment of the present invention. It should be understood that the working principle of the bridgeless PFC circuit in FIG. 11 is the same as that of the bridgeless PFC circuit having only a two-phase interleaved PFC circuit.

In conclusion, the bridgeless PFC circuit according to the embodiment of the present invention includes an alternating current power supply module, a power module, and a control module, where the alternating current power supply module is connected to the power module, so as to provide electrical energy for the power module, and the power module includes one or more interleaved PFC circuits, where each interleaved PFC circuit includes one inductor, one pair of first switching components, and at least one capacitor. Specifically, a first end of the inductor is connected to the alternating current power supply module, and a second end of the inductor is connected to one end of each capacitor through one of the first switching components and is also connected to the other end of each capacitor through the other one of the first switching components. The control module is configured to turn off a first switching component in the power module. Therefore, the characteristics of the control method of the bridgeless PFC circuit according to the embodiment of the present invention lies in that: the control module detects a current flowing through each first switching component in the power module; and when the control module detects that a current reaches a preset current, the control module turns off a first switching component through which the preset current flows, where the preset current should be a negative current. Therefore, the control module may include a TCM controller.

The detecting, by the control module, a current flowing through each first switching component in the power module may also be: sampling, by the control module, a current flowing through each first switching component in the power module, and detecting a sampled current.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for the detailed working processes of the foregoing system, apparatus, and units, reference may be made to the corresponding process in the foregoing method embodiments, and details are not described herein again.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments.

In addition, functional units in each embodiment of the present invention may be integrated into one processing unit, or each of the units may exist alone physically, or two or more units are integrated into one unit.

What is claimed is:

1. A bridgeless power factor correction (PFC) circuit, comprising:
    an alternating current power supply module;
    a power module;
    a control module;
    a first set of at least four wires; and
    a second set of at least four wires,
    wherein the alternating current power supply module is connected to the power module to provide electrical energy for the power module,
    wherein the power module comprises one or more interleaved PFC circuits,
    wherein each interleaved PFC circuit comprises one inductor, one pair of first switching components, and at least one capacitor,
    wherein a first end of the inductor is connected to the alternating current power supply module,
    wherein a second end of the inductor is connected to one end of each capacitor through one of the first switching components and is also connected to the other end of each capacitor through the other one of the first switching components,
    wherein the first switching components comprise at least four switching components,
    wherein the at least four switching components comprise at least four transistors,
    wherein one end of each of the first set of at least four wires is connected directly to a drain of one of the at least four transistors and another end of each of the first set of at least four wires is connected to the control module such that all of the at least four transistors have the drain connected to the control module,
    wherein the control module samples a current flowing through each of the at least four switching components through the first set of at least four wires in the power module,
    wherein one end of each of the second set of at least four wires is connected to a gate of each of the first switching components and another end of each of the second set of at least four wires is connected to an output of the control module such that all of the at least four switching components have the gate connected to the output of the control module through a different individual wire,
    wherein the control module turns on and off the at least four switching components using the second set of at least four wires and according to directions and values of the currents flowing through each of the at least four switching components in the power module,
    wherein the control module sets a threshold for a negative current, and
    wherein the control module turns off any one of the at least four switching components when the negative current flowing through the any one of the at least four switching components reaches the threshold to avoid a reverse recovery current in a body diode of the any one of the at least four switching components.

2. The circuit according to claim 1, wherein the at least one capacitor comprises a plurality of capacitors connected in parallel.

3. The circuit according to claim 1, wherein the control module comprises a current sampling component and a triangular current mode (TCM) controller, wherein an end of the current sampling component is connected to the drain or the source of each first switching component in the power module, wherein another end of the current sampling component is connected to an input end of the TCM controller, and wherein an output end of the TCM controller is connected to a gate of each first switching component in the power module.

4. The circuit according to claim 3, wherein the current sampling component comprises a resistor or a current transformer (CT).

5. The circuit according to claim 3, wherein the TCM controller is formed by a discrete component or a logic device.

6. The circuit according to claim 5, wherein the logic device comprises a complex programmable logic device (CPLD) or a field programmable gate array (FPGA).

7. The circuit according to claim 1, wherein the alternating current power supply module comprises an alternating current power supply and two second switching components, wherein each of the second switching components is connected to the alternating current power supply and one of the first switching components of the power module.

8. The circuit according to claim 1, wherein the first switching component is an insulated gate bipolar transistor (IGBT) or a metal-oxide-semiconductor field-effect transistor (MOSFET).

9. The circuit according to claim 1, wherein the one or more interleaved PFC circuits share one common capacitor, and wherein the one common capacitor is connected in parallel with the one pair of first switching components.

10. The circuit according to claim 9, wherein the alternating power supply module comprises two diodes connected in series with each other, and wherein the two diodes are connected in parallel with the one pair of first switching components and the one common capacitor.

11. The circuit according to claim 1, wherein the one inductor of each interleaved PFC circuit has a triangular current waveform, and wherein the one pair of first switching components has a square current waveform.

12. The circuit according to claim 1, wherein each one of one or more interleaved PFC circuits comprises a plurality of capacitors, wherein the plurality of capacitors are connected in parallel, wherein one end of a parallel connection of the plurality of capacitors is connected to a first one of the first switching components, and wherein a second end of the parallel connection of the plurality of capacitors is connected a second one of the first switching components.

13. A control method of a bridgeless power factor correction (PFC) circuit, wherein the bridgeless PFC circuit comprises an alternating current power supply module, a power module, a control module, a first set of at least four wires, and a second set of at least four wires, wherein the alternating current power supply module is connected to the power module to provide electrical energy for the power module, wherein the power module comprises one or more interleaved PFC circuits, wherein each interleaved PFC circuit comprises one inductor, one pair of first switching components, and at least one capacitor, wherein a first end of the inductor is connected to the alternating current power supply module, wherein a second end of the inductor is connected to one end of each capacitor through one of the first switching components and is also connected to the other end of each capacitor through the other one of the first switching components, wherein the control module is configured to turn on and off a first switching component in the power module, and wherein the method comprises:
  detecting, by the control module, a current flowing through each of the first switching components through the first set of at least four wires in the power module, wherein the first switching components comprise at least four switching components, wherein the at least four switching components comprise at four transistors, wherein one end of each of the first set of at least four wires is connected directly to a drain of one of the at least four transistors and another end of each of the first set of at least four wires is connected to the control module such that all of the at least four transistors have the drain connected to the control module; and
  turning on and off, by the control module, the at least four switching components using the second set of at least four wires and according to directions and values of the currents flowing through each of the at least four switching components in the power module,
  wherein one end of each of the second set of at least four wires is connected to a gate of each of the first switching components and another end of each of the second set of at least four wires is connected to an output of the control module such that all of the at least four switching components have the gate connected to the output of the control module through a different individual wire,
  wherein the control module sets a threshold for a negative current, and
  Wherein the control module turns of any one of the at least four switching components when the negative current flowing through the any one of the at least four switching components reaches the threshold to avoid a reverse recovery current in a body diode of the any one of the at least four switching components.

14. The control method according to claim 13, wherein detecting, by the control module, the current flowing through each of the first switching components in the power module comprises sampling, by the control module, the current flowing through each of the first switching components in the power module and detecting a sampled current.

15. The control method according to claim 13, wherein the control module turns on and off the at least four switching components according to a preset current that is a negative current.

16. The control method according to claim 13, wherein the control module comprises a triangular current mode (TCM) controller.

17. The control method according to claim 13, wherein the one or more interleaved PFC circuits share one common capacitor, and wherein the one common capacitor is connected in parallel with the one pair of first switching components.

18. The control method according to claim 17, wherein the alternating power supply module comprises two diodes connected in series with each other, and wherein the two diodes are connected in parallel with the one pair of first switching components and the one common capacitor.

19. The control method according to claim 13, wherein the one inductor of each interleaved PFC circuit has a triangular current waveform, and wherein the one pair of first switching components has a square current waveform.

20. The control method according to claim 13, wherein each one of one or more interleaved PFC circuits comprises a plurality of capacitors, wherein the plurality of capacitors are connected in parallel, wherein one end of a parallel connection of the plurality of capacitors is connected to a first one of the first switching components, and wherein a second end of the parallel connection of the plurality of capacitors is connected a second one of the first switching components.

* * * * *

UNITED STATES PATENT AND TRADEMARK OFFICE
CERTIFICATE OF CORRECTION

| | | |
|---|---|---|
| PATENT NO. | : 9,570,973 B2 | Page 1 of 1 |
| APPLICATION NO. | : 14/017442 | |
| DATED | : February 14, 2017 | |
| INVENTOR(S) | : Wenbin Chen, Shengyong Dai and Boning Huang | |

It is certified that error appears in the above-identified patent and that said Letters Patent is hereby corrected as shown below:

In the Claims

Column 10, Line 18, Claim 13 should read:
"wherein the control module turns off any one of the at"

Signed and Sealed this
Second Day of May, 2017

Michelle K. Lee
*Director of the United States Patent and Trademark Office*